R. D. MERSHON & J. S. RIDDILE.
ELECTROLYTIC CONDENSER.
APPLICATION FILED DEC. 14, 1910. RENEWED MAY 24, 1913.

1,077,627.

Patented Nov. 4, 1913.

Witnesses:
Raphaël Netter
S. S. Dunham

John S. Riddile and
Ralph D. Mershon, Inventors
By their Attorneys
Kerr, Page, Cooper & Hayward

UNITED STATES PATENT OFFICE.

RALPH D. MERSHON AND JOHN S. RIDDILE, OF NEW YORK, N. Y.; SAID RIDDILE ASSIGNOR TO SAID MERSHON.

ELECTROLYTIC CONDENSER.

1,077,627.  Specification of Letters Patent.  Patented Nov. 4, 1913.

Application filed December 14, 1910, Serial No. 597,280. Renewed May 24, 1913. Serial No. 769,768.

*To all whom it may concern:*

Be it known that we, RALPH D. MERSHON and JOHN S. RIDDILE, citizens of the United States, residing at New York, in the county and State of New York, have invented certain new and useful Improvements in Electrolytic Condensers, of which the following is a full, clear, and exact description.

This invention relates to electrolytic condensers, a type of electrolytic apparatus consisting generally of two or more electrodes immersed in a suitable electrolyte, as for example plates or sheets of aluminum immersed in a solution of borax.

The object of the invention, briefly stated, is to provide means for improving the efficiency of the condenser and for preventing deterioration of the electrode films (upon which the action of the condenser depends) due to the perforation of the films incident to flow of current from the electrolyte to the electrodes.

To this and other ends the invention consists in the novel features and combinations hereinafter described and more particularly set forth in the appended claims.

Figure 1:
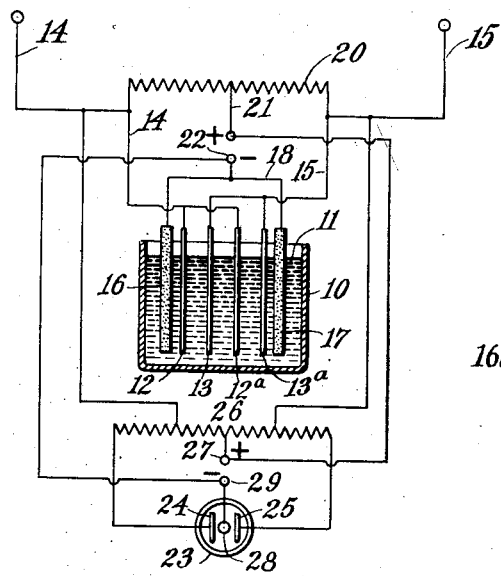
Figure 3:
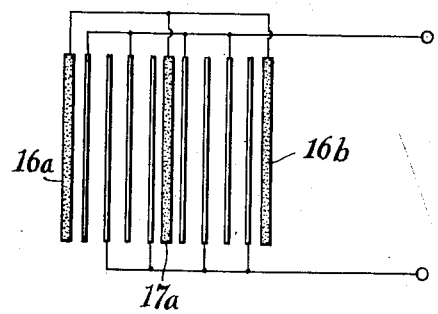
Figure 2:
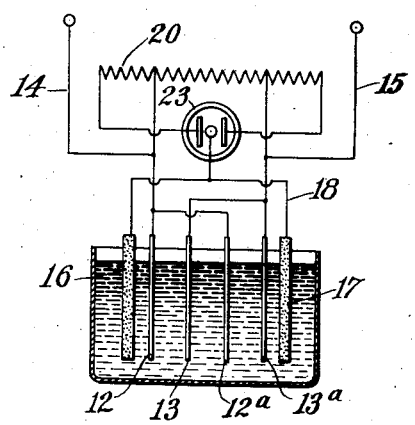
Figure 4:
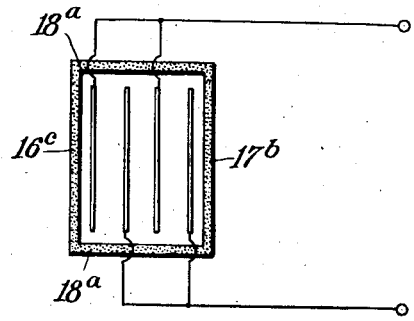

In the accompanying drawing Figure 1 is a diagrammatic sectional view of a convenient and effective embodiment of the invention, and Fig. 2 is a similar view of a modification. Figs. 3 and 4 are diagrammatic plan views of other modifications.

The condenser illustrated consists of a tank or receptacle 10, containing a suitable electrolyte 11, in which the electrodes 12, 12$^a$, 13, 13$^a$ are immersed. Alternate electrodes are connected together, those designated by 12 being connected to a terminal 14 and those designated by 13 to a terminal 15.

When the condenser is in operation the charge on one set of plates or electrodes induces a charge of opposite sign on the other set, the electrodes of the one set acting inductively on the adjacent plates of the other set through the dielectric films and through the conducting electrolyte. Thus a charge is induced on a plate 13, for example, by charges on plates 12 and 12$^a$ and similarly a charge is induced on plate 13$^a$ not only by the charge on plate 12$^a$ but also by the charge on plate 12. In the latter case it will be seen that the displacement current between plates 12 and 13$^a$, (that is, virtually the current between the outer faces of 12 and 13$^a$), producing a charge on 13$^a$, has to flow through a much greater thickness of electrolyte, and hence through greater resistance since the plates 12 and 13$^a$ are spaced farther apart. Consequently the end plates are less efficient than the intermediate plates, which are relatively close together. This defect is overcome in our present invention, as exemplified in Figs. 1 and 2, by the provision of what may be for convenience termed collecting electrodes 16, 17. These are composed of carbon or other conducting material preferably not subject to attack chemically or electrochemically by the electrolyte employed, and are immersed in the liquid alongside of the end electrodes 12, 13$^a$, as shown in the drawing. The collectors or collecting electrodes being connected electrically by a conductor 18, it will be seen that the charge on plate 12, for example, acts inductively on plate 13$^a$, through the medium, as conductors, of the portion of the electrolyte between plate 12 and the collecting electrode 16, the conductor 18, the collecting electrode 17, and the portion of the electrolyte between the latter and the plate 13$^a$; the effect being equivalent, if we neglect the resistance of the carbon electrodes 16, 17, and the conductor 18, to reducing the thickness of electrolyte between the two plates to a thickness equal to the sum of that between 12 and 16, and that between 13$^a$ and 17. The plates 12 and 13$^a$ thus act as if they were side by side, like the intermediate plates.

At times it may be desirable to employ collecting electrodes at intermediate points in the series of filmed electrodes, as for example when a considerable number of the latter are used. Thus in Fig. 3 three collectors, 16$^a$, 17$^a$, 16$^b$, are employed. Nor is it necessary that the collectors be separate plates connected by a wire or wires, as other forms equally effective may be used. For instance the collectors may be attached to or integral with side members as in Fig. 4, in which the end plates 16$^c$ and 17$^b$ are integral with the side plates 18$^a$, making an open-topped shell or box. The collecting electrodes are also capable of use for another purpose, which will now be described.

The electrolytic condenser, like the electrolytic rectifier, depends for its action upon the properties of the film which can be formed electrolytically on the surface of aluminum, tantalum, magnesium and certain other metals when immersed in an electrolyte and subjected to the electric current; which film possesses the singular property of allowing current to flow from the electrolyte to the electrode with little or no opposition but of strongly opposing current tending to flow from the electrode to the electrolyte. To current tending to flow in the direction last indicated the film though excessively thin, possesses high specific resistance and high dielectric strength, being able to withstand very considerable voltages without rupture, and with very inconsiderable leakage current. However, flow of current from the electrolyte to the electrode is accompanied by perforation of the film, with reduction of efficiency in the operation of the condenser by reason of the increased loss; and, in addition, repeated perforation and reformation of the film results in gradual deterioration of the film and corrosion of the underlying metal. On starting, with freshly formed films on the electrodes, there is little or no perforation, and consequently the condenser operates with high efficiency; but in a short time perforation begins and increases rapidly, with marked decrease of efficiency. It has been ascertained that the absence of perforation and the consequent high efficiency at starting is due to the presence of a negative charge in the electrolyte, said charge being due to an initial flow of current from the electrolyte to the electrode or electrodes which at starting happened to be the "negative" electrodes of the condenser, and that if this charge is diminished, as by leakage or otherwise, it will be replaced, with accompanying flow of current from the electrolyte to the electrodes which are "negative" at the time and with consequent perforation of the film on such electrodes. Since in the operation of the condenser each electrode is alternately "positive" and "negative" it will be seen that all the films are subject to impairment from the cause described. Hence the continuance of the high initial efficiency of the condenser depends, other injurious agencies being taken care of, upon prevention of perforation of the film, and that, in turn depends upon the maintenance of the negative charge in the electrolyte by some means not dependent upon or accompanied by flow of current from the electrolyte to the negative electrodes. It has therefore been proposed to charge or excite the condenser by external means, as for example by the method exemplified in the drawing. According to our present invention the collecting electrodes 16, 17, are employed as elements of the exciting means, in addition to performing their charge-collecting and delivering function above described.

Referring now to Fig. 1, 20 designates an auto-transformer connected across the leads 14, 15, and having a tap 21 brought out from its middle point. According to the principle of the electrolytic rectifier there will, when the leads 14 and 15 are connected with a source of alternating current, be produced between the tap 21 and the terminal 22 brought out from the conductor 18 a unidirectional E. M. F. tending to produce a flow of current from 21 to 22. On investigating the cause of this E. M. F. it is found to be a manifestation of, and to be proportional in value to, the electrolyte charge above mentioned. Suppose now that part of this electrolyte charge leaks away, thereby setting free a portion of the positive charge bound on the filmed electrodes. The difference of potential between 21 and 22, in other words the E. M. F. tending to produce current there-between, will be reduced correspondingly; but immediately an impulse of current comes in over one of the condenser terminals the former value of the said E. M. F. and of the electrolyte charge is restored, with perforation of the films on the electrodes which happen to be "negative" at the time. Suppose, however, that the positive pole of a source of unidirectional current be connected to 21 and the negative pole of such source to 22. Now if the electrolyte charge be diminished the portion of the positive charge thus freed on the condenser electrodes will be supplied by current from the unidirectional source and in consequence the lost portion of the electrolyte charge will be restored by the inductive effect of the now normal electrode-charge; and this, it will be observed, without flow of current from the electrolyte to the filmed electrodes.

Various means may be employed for supplying the unidirectional charging current, as for example the means illustrated in Fig. 1. Here a small electrolytic rectifier 23 is provided, having filmed electrodes 24, 25, connected to an auto-transformer 26, which is in turn connected to the auto-transformer 20. From the middle of the transformer 26 a terminal 27 is brought out, and the non-filming electrode 28 of the rectifier is connected to a terminal 29. The transformer just mentioned is also connected to the condenser leads 14, 15. Remembering now that current can flow freely from the electrode 28 to the electrodes 24, 25, it will be seen that when an alternating E. M. F. is impressed on the leads 14, 15, a unidirectional E. M. F. will be produced between 27 and 29 in the direction indicated by the algebraic signs. The terminal 27 is therefore connected with 21, and 29 with 22. The result is that so long as the E. M. F. between 21 and 22 is equal to that between 27 and 29 no current will flow from the rectifier; but if part of the electrolyte charge leaks away, current will flow from the rectifier in sufficient amount to replace the charge or the part of the charge so lost, thus obviating the necessity or possibility of perforation of the films on the condenser electrodes.

The arrangement shown in Fig. 2 is analogous to that in Fig. 1, but in the former the main auto-transformer 20 is connected to the exciter-rectifier 23 so as to perform the functions of both transformers shown in Fig. 1. In either case the exciting voltage should be at least equal to if not greater than that generated in the condenser by the impressed alternating E. M. F.; a condition which can be obtained by suitably positioning the transformer taps, as will be readily understood.

From the foregoing it will be seen that the collecting electrodes 16, 17 also constitute charging electrodes, by the aid of which the condenser may be kept "charged" or "excited" without suffering injury to the electrode film, thus overcoming the chief of the drawbacks that have heretofore militated against the practical success of the electrolytic condenser. Moreover, the use of collecting electrodes, bridging a portion or portions of the electrolyte, prevents the current seeking an extraneous metal path between the points connected by the collecting electrodes. Flow of current through such path, for example, through portions of the tank, or through devices employed to support and position the filmed electrodes, might cause electrolytic action which would prove destructive to the tank or other devices referred to. For example, in our co-pending application filed of even date herewith, Serial No. 597,279, we have described electrode-supporting and positioning devices which, when made of metal, might be subject to electrolytic attack by serving as a current path between different points in the electrolyte. But by employing collecting electrodes at such points the current would flow through the conductor connecting the electrodes named, instead of through the supporting and positioning devices. Also, we are thus enabled to make the tank of metal, instead of insulating material, which is more fragile than metal, or instead of providing the tank with an insulating lining.

As previously stated, the invention can be embodied in various forms, particularly as regards the excitation of the condenser, and it is therefore to be understood that the arrangements herein specifically illustrated and described are merely examples of how the invention can be conveniently and effectively applied in practice.

The word "series" as used in the appended claims has reference merely to the spatial arrangement of the electrodes and has no significance in respect of their electrical connections.

What we claim is:

1. In an electrolytic condenser, the combination with a series of condenser electrodes, of collecting electrodes arranged at the ends of the series of condenser electrodes and electrically connected together.

2. In an electrolytic condenser, the combination with a series of filmed electrodes arranged side by side, of collecting electrodes arranged to coöperate with two or more electrodes of the said series and electrically connected together.

3. In an electrolytic condenser, the combination with a series of inductively related electrodes adapted to be immersed in an electrolyte, of means for bridging a portion of the electrolyte between two or more electrodes of the series.

4. In an electrolytic condenser, the combination with a series of inductively related filmed electrodes adapted to be immersed in an electrolyte, of collecting electrodes serving to bridge a portion of the electrolyte between two or more electrodes of the series, and exciting means having one terminal connected with the inductively related electrodes and the other connected with the collecting electrodes.

5. In an electrolytic condenser, the combination of a series of inductively related filmed electrodes adapted to be immersed in an electrolyte, electrically connected charge-collecting electrodes adapted to be immersed in the electrolyte adjacent to one or more of the filmed electrodes, and means electrically connected with the filmed electrodes and with the collecting electrodes for opposing the flow of current from the electrolyte to the filmed electrodes.

6. In an electrolytic condenser, the combination of a series of inductively related filmed electrodes adapted to be immersed in an electrolyte, means for bridging a portion of the electrolyte between two or more of the filmed electrodes, and means connected with the filmed electrodes and said bridging means for exciting the condenser.

7. In an electrolytic condenser, the combination of a series of inductively related filmed electrodes adapted to be immersed in an electrolyte, means for bridging a portion of the electrolyte between two or more of the filmed electrodes, a transformer connected with the filmed electrodes and adapted to be connected with a source of alternating current, and means connected with the transformer and the said bridging means for exciting the condenser.

8. In an electrolytic condenser, the combination of a series of inductively related filmed electrodes adapted to be immersed in an electrolyte, means for bridging a portion of the electrolyte between two or more of the filmed electrodes, and electrolytic means connected with the filmed electrodes and the said bridging means for opposing flow of current from the electrolyte to the filmed electrodes.

9. In an electrolytic condenser, in combination of a series of inductively related filmed electrodes adapted to be immersed in an electrolyte, means for bridging a portion of the electrolyte between two or more of the filmed electrodes, a transformer connected to the filmed electrodes, and an electrolytic rectifier having filmed electrodes connected to the transformer and a non-filming electrode connected to said bridging means.

In testimony whereof we affix our signatures in the presence of two subscribing witnesses.

RALPH D. MERSHON.
JOHN S. RIDDILE.

Witnesses:
M. LAWSON DYER,
S. S. DUNHAM.